Oct. 11, 1966 V. L. HAUG 3,277,763
NOTCHING MACHINE
Filed April 23, 1964 4 Sheets-Sheet 1
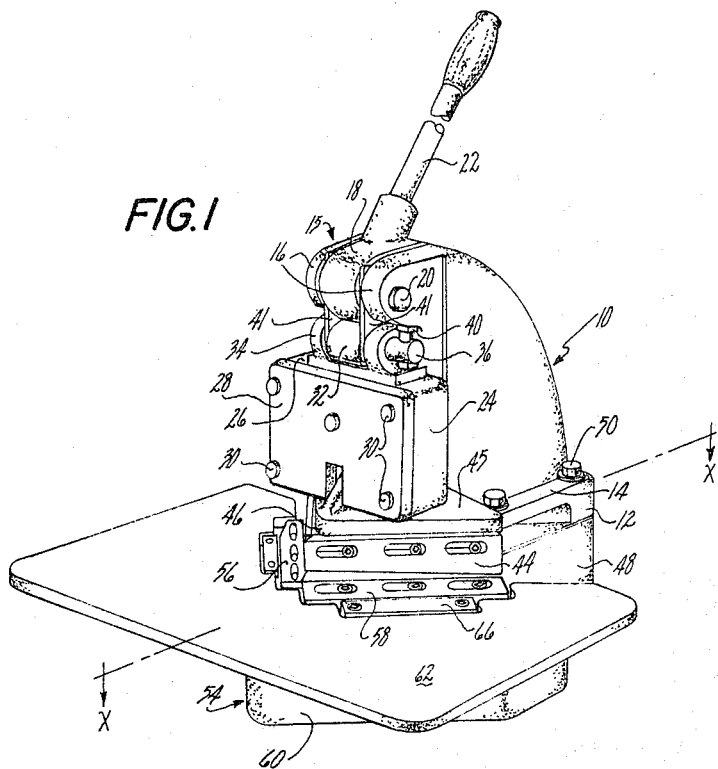
FIG. I
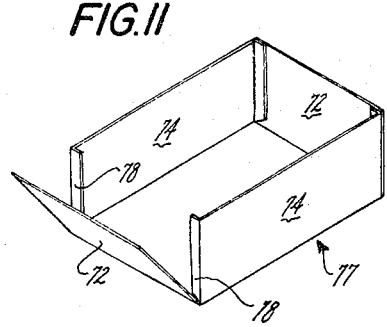
FIG. II
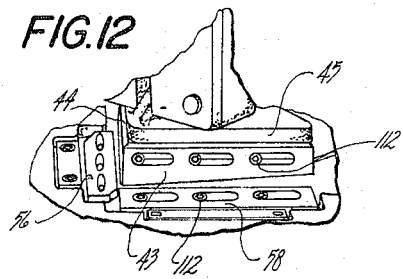
FIG. 12
INVENTOR.
VERNON L. HAUG
BY
McCormick, Paulding & Huber
ATTORNEYS Oct. 11, 1966  V. L. HAUG  3,277,763
NOTCHING MACHINE
Filed April 23, 1964 4 Sheets-Sheet 2
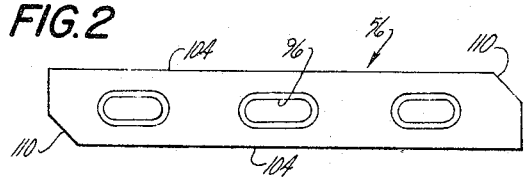
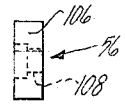
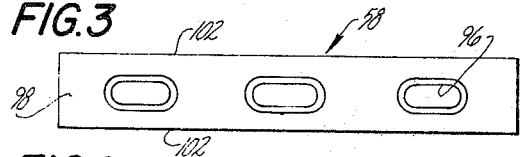
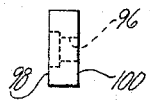
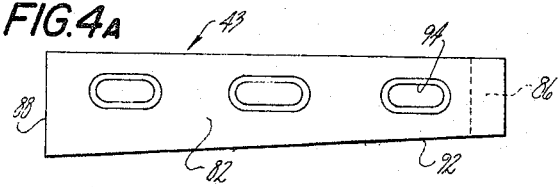
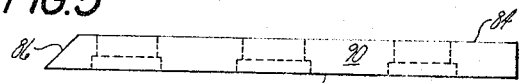
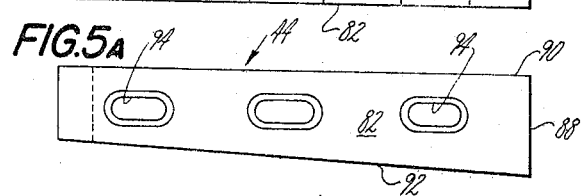
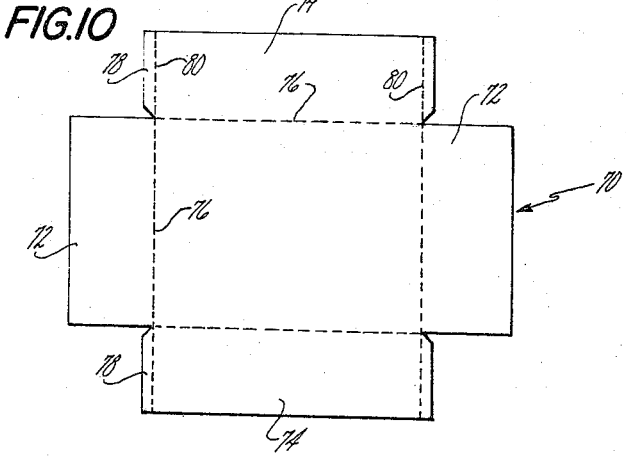

Oct. 11, 1966   V. L. HAUG   3,277,763
NOTCHING MACHINE
Filed April 23, 1964   4 Sheets-Sheet 4

United States Patent Office 3,277,763
Patented Oct. 11, 1966

3,277,763
NOTCHING MACHINE
Vernon L. Haug, Webster Groves, Mo., assignor to The Peck, Stow & Wilcox Co., Southington, Conn., a corporation of Connecticut
Filed Apr. 23, 1964, Ser. No. 361,966
6 Claims. (Cl. 83—641)

This invention relates to a machine for cutting sheet material and more particularly to a notching machine of the type generally used in metal working shops for notching sheet metal.

The present invention, while particularly directed to a bench-type notching machine, is readily adapted for use with any metal notcher generally comprising a frame supported by a base and having a portion of the frame extending forwardly over the front of the base defining a work receiving throat therewith. A vertically reciprocal ram generally carried by the forwardly extending portion of the frame supports an upper blade assembly arranged in vertical alignment with a lower blade assembly carried by the base to engage work placed therebetween. Each blade assembly includes a pair of rearwardly diverging blades preferably disposed at right angles to each other, and adjustable to meet in an included angle bisected by a vertical plane containing the fore and aft centerlines of the frame and the base.

Notchers of the aforementioned type are in general use by fabricators of boxes of the type formed from a generally flat blank of sheet material and which have a bottom portion and attached side portions contiguous with, and bent upwardly from, the bottom portion, the sides being formed by notching each of the corners of the flat blank. The present invention is particularly directed to means for making a conventional "box notch" in each corner of the blank with only one notching operation. It is apparent that by eliminating the multiple notching or cutting now required for each corner of the box blank to effect such a notch, a substantial cost reduction will result.

It is therefore an object of the present invention to provide both an efficient and inexpensive notching machine adapted to extend the utility of the conventional notcher whereby it will cut in a single notching operation, a box notch in the corner of a flat blank of sheet material of the type used for forming boxes thereby eliminating the present practice of multiple cutting; to provide such a machine that can be readily converted from "box-notching" to conventional cutting and notching, without changing blades; and to provide such a notching machine without limiting its effectiveness or utility for box-notching, conventional notching, squaring, shearing, etc.

Other objects and advantages of the present invention will become more readily apparent from the following description and accompanying drawings which show a preferred embodiment of the invention and such embodiment will be described, but it will be understood that various changes and modifications may be made from the construction disclosed and that the drawings and description are not to be construed as defining or limiting the scope of the invetnion, the claims forming a part of this specification being relied upon for that purpose.

In the drawings:

FIG. 1 is a perspective view of a sheet material notching machine embodying the present invention;

FIGS. 2 and 3 are plan views of the lower left and right cutting blades respectively of the lower blade assembly;

FIGS. 2a and 3a are end views of the blades shown in FIGS. 2 and 3 respectively;

FIGS. 4, 5, 4a and 5a are plan views and elevational side views respectively of the upper left and right cutting blades of the upper blade assembly;

FIG. 10 is a plan view of a one-piece box blank shown with a box notch in each corner thereof;

FIG. 11 is a perspective view of a partially formed box made from the blank of FIG. 10; and FIG. 12 is a fragmentary perspective view showing the upper and lower blades arranged for pierce cutting.

Figure 6:
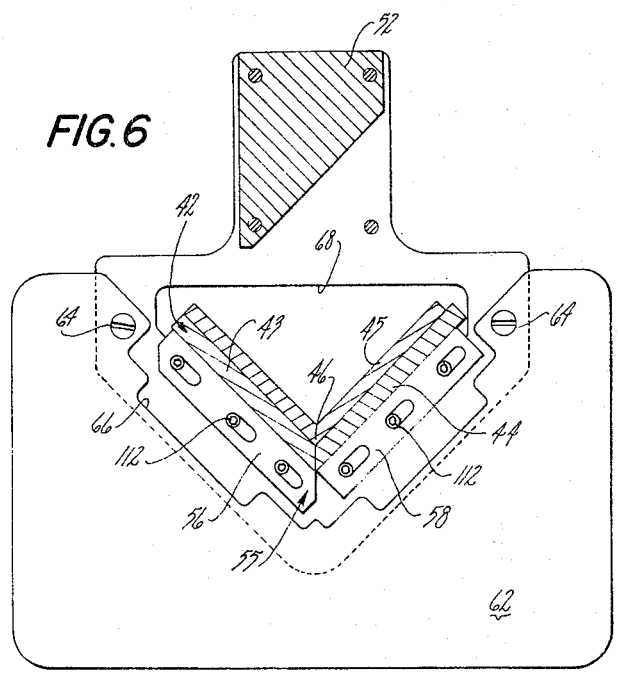
FIGS. 6, 7, 8 and 9 are horizontal sectional views taken substantially along a line such as X—X of FIG. 1, and showing various positions of the upper and lower blades for effecting box notch cutting and conventional notch cutting.

The notching machine of the present invention is of substantially the same type and general description as the notching machine described in application, Serial No. 246,200 filed December 20, 1962, and now abandoned and includes a frame 10, having an enlarged portion 12 formed by flanges 14, 14 extending laterally in opposite directions from the lower portion thereof as shown. The upper forward portion of the frame is provided with a ram assembly 15 including integral, forwardly extending, spaced projections or ears 16, 16 arranged to receive an eccentric cam 18 therebetween for limited rotative movement about a horizontal cam pivot pin 20. A handle 22 extends from the cam 18 to permit manual rotation of the cam about the pivot 20. Opposed guide portions 24, 24 extend laterally outwardly in opposite directions from the front of the frame below the ears 16, 16 to form a vertical guideway below, and aligned with, the recess formed by the ears to receive an elongated slide or ram 26 constructed and arranged to reciprocate vertically within the assembly in the guideway. The ram is retained in the guideway by a front cover plate or cap 28 spanning the spaced guide portions and removably secured thereto by bolts 30 as shown in FIG. 1. The bifurcated upper portion of the ram is adapted to receive a cam roller 32 mounted between the furcations 34, 34 on a pin 36 extending horizontally through aligned openings in the furcations 34, 34 to permit rotative movement of the cam roller about the horizontal axis of the pin 36. The cam roller is arranged and adapted for engagement by the cam 18 whereby the ram may be made to reciprocate vertically within the guideway upon rotative movement of the cam about the pivot pin 20 responsive to forward and rearward movement of the handle 22. The downward movement of the ram may be adjustably limited by a ram stop 40 adjustably disposed as shown in FIG. 1 to extend through a vertical opening in the extending free end portion of the pin 36. As the cam is rotated, the stop 40 moves vertically with the ram and into and out of engagement with the upper surface of the guide portion. It is obvious that the pin may extend over either guide portion on either side of the ram with equally effective results. Suitable links 41, 41 are employed in the usual manner as shown to lift the ram upwardly as the cam 18 and handle 22 are rotated rearwardly about the cam pivot 20.

An upper blade assembly 42 comprising upper left and right blades 43 and 44 respectively, is removably and adjustably attached to an enlarged end portion 45 of generally triangular configuration depending from the lower end of the ram 26, and having a forward apex 46 lying on the vertical plane containing the fore and aft centerlines of the frame 10 and supporting base 48. The upper left and right blades are carried by the ram to diverge rearwardly from an included angle of approximately 90°.

The frame 10 is supported on, and removably secured to the base 48 by bolts 50. The base is of conventional configuration, comprising a rear portion 52 and a forward portion 54 which extends horizontally forward from the rear portion beneath the upper blade assembly and adjustably supports a lower blade assembly 55. The lower blade assembly includes a lower left blade 56 and a lower right blade 58 arranged and aligned to cooperate with the upper blade assembly in the usual manner for cutting sheet material positioned in the throat of the notcher between the blade assemblies. The base 48 is provided with sufficient reinforcement such as ribbing or the like to provide strength and rigidity including a downwardly extending skirt 60 surrounding the perimeter of the base.

A work supporting table 62 is removably attached to the forward portion 54 of the base, as shown, by screws 64, 64 and is formed with a generally V-shaped forwardly extending opening 66 in the inner or rear side thereof to accommodate the lower blade assembly and to permit waste cutouts to drop from the blade assemblies through an opening 68 provided in the base to be collected in any suitable container (not shown) placed thereabeneath.

In accordance with the present invention, the blades included in both the upper and lower blade assemblies are each constructed and arranged to permit adjustment for use in single step box notching in addition to conventional notching, slitting, squaring and shearing performed by machines of this general type.

FIG. 10 of the drawing shows a one-piece blank 70 provided with corner box notches of the type generally used for forming boxes from sheet material. It is apparent that merely folding or bending each of the extending ends 72, 72 and sides 74, 74 upwardly about its respective fold line 76 will form a box 77 as shown in FIG. 11. The box notch cut in the corners of the blank is formed with the particular configuration shown to provide opposed integral tabs 78 on opposite ends of the sides 74, 74 which, when bent inwardly about their respective fold lines 80, provide supporting surfaces against which the ends 72, 72 may be soldered, brazed or otherwise secured. While the tabs 78 are shown in the drawings, FIGS. 10 and 11, as forming extensions on the opposite ends of the sides 74, 74, it is obvious that they may extend with equal utility from the ends 72, 72.

The usual practice in the industry has been to make the box notch shown in the drawings in two operations; first, a conventional 90° corner notch is cut in each of the corners of a single piece of sheet metal precut to the desired size and configuration. After corner notching the work in the usual manner, a second, smaller notch is cut in the sheet substantially at the vertex of the included angle of each corner notch. One side thereof is common with and forms an extension of one of the adjacent sides of the said included angle; the other side diverges at approximately 45° therefrom, as shown in the drawing, to form the aforesaid tabs 78.

As previously mentioned, each of the blades included in both the upper and lower blade assemblies are arranged and constructed to permit corner box notching as described, but however, by a single cutting operation. As shown in the drawings, the upper blades 43 and 44 are similar polyhedrons having trapezoidal front and rear, parallel, vertical faces 82 and 84 respectively, and rectangular fore and aft vertical ends 86 and 88 respectively. The aft end 88 lies in a plane perpendicular to the faces 82 and 84, while the end 86 lies in a plane extending between and intersecting the front and rear faces at an angle of 45° thereby forming trapezoidal top and bottom blade surfaces 90 and 92. The top surface 90 of each upper blade lies in a common horizontal plane while the plane of the bottom surfaces 92 is inclined downwardly, from front to rear, as shown in FIG. 1 at approximately 4° from the horizontal, whereby the vertical dimension of the aft end 88 is greater than that of the forward end 86. Cutting edges surround the bottom surfaces 92 of each blade at the perimeters thereof.

The upper blades are costructed to be mounted on the ram to diverge rearwardly as shown and are each formed with elongated, longitudinally extending openings 94 extending between the front and rear vertical faces 82 and 84, and through which each blade may be adjustably bolted to the ram. It is obvious that the elongated openings permit individual front to rear adjustment of each blade on the ram as may be required.

The lower blade assembly 55, supported by the base 48 beneath the ram 26, includes a left blade 56 and a right blade 58. As shown in FIG. 3, the lower right blade 58 generally comprises an elongated, rectangular prism formed with a plurality of elongated, longitudinally extending openings 96 extending between upper and lower faces 98 and 100 respectively, whereby the blade may be adjustably bolted to the base 48. Each face is provided with opposed cutting edges 102, as shown, surrounding the perimeters thereof.

The lower left blade 56 is of similar configuration to the lower right blade, also being provided with openings 100 for adjustably securing the blade to the base and with opposed cutting edges 104 on the longitudinal edges of the upper and lower faces thereof. It differs significantly, however, in that one pair of diagonally opposed corners are identically relieved, as in FIG. 2, to form similar parallel surfaces 106 and 108 perpendicular to the upper and lower faces of the blade and intersecting the adjacent sides of their respective included corners at 45° therewith. Cutting edges 110 are thereby formed to intersect cutting edges 104 as shown.

The lower blades are secured to the base 48 in rearwardly diverging relationship aligned with and beneath the upper blades for cooperation therewith in cutting sheet material placed therebetween.

Figure 7:
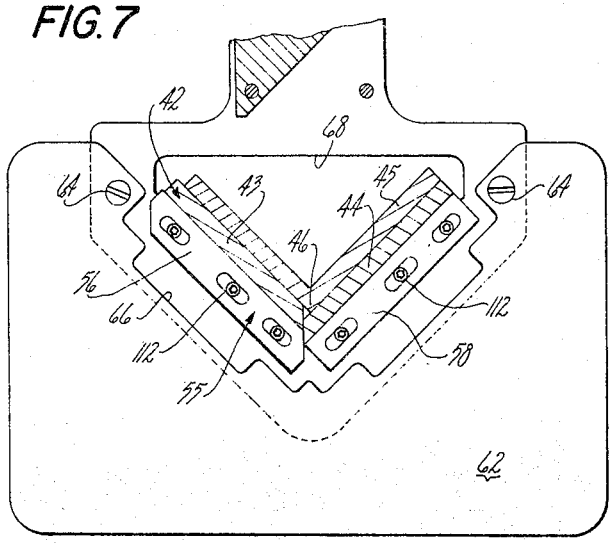
Figure 8:
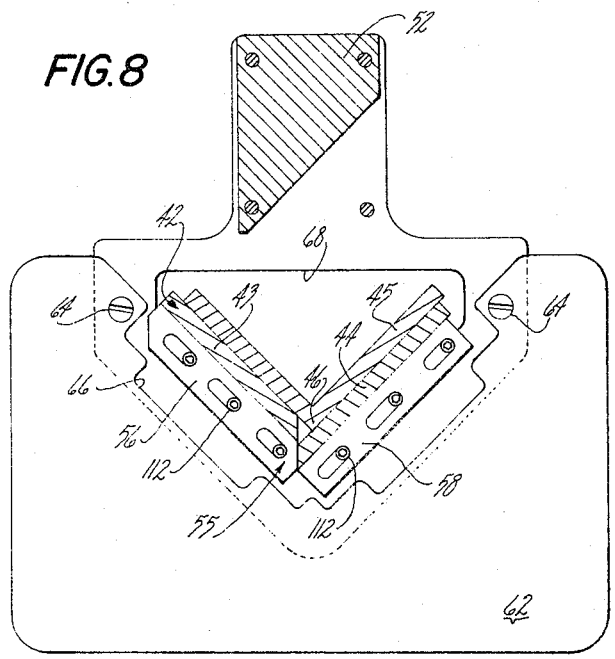

To cut a box notch in the corner of a workpiece in a single cutting operation, the upper and lower blades are adjusted on the ram and base as shown in FIGS. 7 and 8 wherein the right blades 44 and 58 are adjusted forwardly with respect to the left blades 43 and 56, with their forward ends extending across the said fore and aft centerlines of the ram and the base. The left blades 43 and 56 are accordingly adjusted rearwardly and arranged to permit the cutting edge on the forward end 86 of the upper right blade to cooperate with the cutting edge 110 on the forward portion of the lower left blade, the remaining cutting edges of the upper and lower blades cooperating in their usual manner to effect the box notch shown in FIG. 10.

In FIG. 8 both the upper and lower right blades are shown in their full forward positions and the upper and lower left blades, in their rearmost positions whereby the vertical surfaces of the forward ends 86, 86 of the upper blades and the vertical surface 106 of the lower left blade lie, as shown, substantially in a common plane disposed to the left of, and extending parallel with, the plane containing the aforesaid fore and aft centerlines of the frame 10 and base 48. It is apparent that with the upper and lower pairs of blades positioned as shown, a tab of maximum width is obtained, the width of the tab corresponding to the width of the blade 44.

When it is preferred that the width of the tab be less than the width of the blade 44, the upper and lower blades may be adjusted on the ram and base respectively by loosening the blade adjustment bolts 112 to permit the right blades to be moved rearwardly and the left blades to be moved forwardly whereby the bolts 112 will be disposed intermediate the forward and rear walls of their respective openings 94 and 96. It can be seen from FIG. 7, that as the plane containing the surface 106 of the lower left blade and the surfaces of the forward ends 86, 86 of the upper left and right blades moves closer to the aforesaid vertical plane containing the centerlines of the said frame and said base, the width of the tab 78 becomes less as a result of the reduction in the lineal extent of cooperating cutting action between the cutting edge 110 of the lower left blade and the cutting edge on the forward end 86 of the upper right blade.

When the upper and lower right blades are adjusted to their rearmost positions, and the upper and lower left blades to their forwardmost positions as shown in FIG. 6, the vertical planes containing the surface 106 of the lower left blade and the surfaces of the foarward ends 86, 86 of the upper blades will coincide with the plane containing the aforesaid centerlines. It is apparent that with the blades so disposed, there is no cooperative cutting action between the cutting edge 110 of the lower left blade and the cutting edge of the forward end 86 of the upper right blade, thereby permitting the blade assembly to cut a conventional V-notch in a workpiece in the usual manner.

It is obvious to those skilled in the art that in the described notch cutting operations, corresponding upper and lower blades are adjusted to permit their respective cutting edges to be properly aligned to permit and to effect cooperative cutting action. It is also apparent that whenever the blades are adjusted, sufficient tolerance must be provided between the upper and lower cutting edges to permit the blades to function in their normal manner.

It should also be noted that the lower blades of the present invention are each arranged and constructed whereby they may be reversed to extend the useful life thereof and suitable cutting edges are therefore provided on the upper and lower faces thereof as previously described. The upper blades 43 and 44 are similarly provided with cutting edges around the perimeters of the bottom surfaces 92 thereof to permit the blades to be arranged on the ram for either "splay" cutting, as in FIG. 1, wherein the cut commences at the outside edge of the workpiece, or for "pierce" cutting, as in FIG. 12, wherein the cut will start at the vertex, or included corner, of the V-notch.

Figure 9:
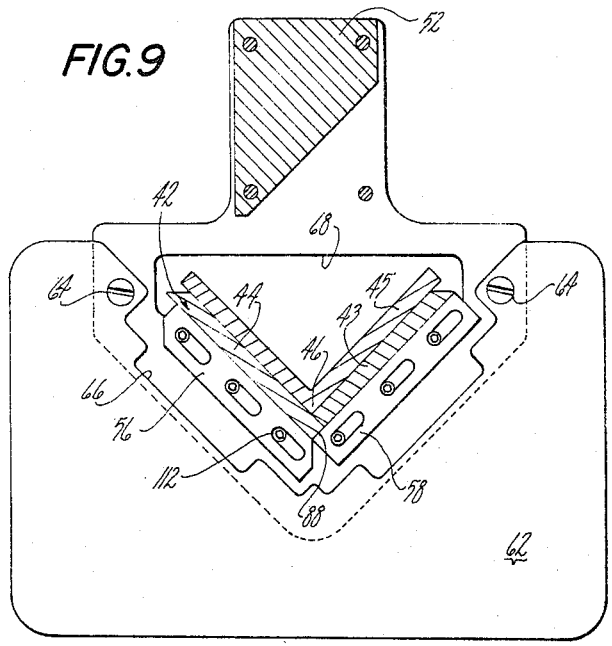

It is to be observed that the upper right blade is made slightly longer than the upper left blade by an amount approximately the width of the blades whereby the blade 44, when arranged for pierce cutting as in FIG. 9, will be adjusted on the ram with its end 88 extending forwardly beyond the apex 46 of the ram, overlapping the end of the blade 43, as shown, and forming a continuation of and lying in the same plane as the face of the blade 43. It is also to be noted that when the upper blades are so arranged for "pierce" cutting the lower right blade 58 is supported in its rearmost position on the base and the lower left blade 56 is supported in its forwardmost position thereon. The lower left blade being slightly longer than the lower right blade.

The invention claimed is:
1. A mechanism for cutting sheet material comprising a base, a frame supported on the base and having a projecting portion extending over the forward portion of the base to define a work receiving throat therewith, a ram vertically reciprocable in the extending portion of the frame, cutting means including vertically alinged upper and lower pairs of rearwardly diverging cutting blades carried by the ram and base respectively to engage work placed therebetween, each such pair of blades comprising left and right blades normally arranged in a first position on opposite sides of a first vertical plane when arranged to meet in an angle bisected by said vertical plane to permit a V-shaped notch to be cut in said work, first cutting edges on said blades, said first cutting edges of each of the upper blades and on one of the lower blades lying in a second vertical plane coinciding with the aforesaid first vertical plane when the blades are arranged in said first position and means associated with said upper and lower blades to permit adjustment thereof in cutting relationship into a second position whereby the said second vertical plane is disposed laterally of the first vertical plane to permit a V-shaped notch to be cut in the work having a relieved portion adjacent to the vertex of said notch and second cutting edges on said blades, the plane containing the second cutting edges of the upper blades being inclined upwardly and forwardly relative to the plane containing the second cutting edges of the lower blades when the said upper and lower blades are arranged in said first position, said upper blades being selectively reversible to permit arrangement thereof on said ram whereby the plane containing the said second cutting edges of said upper blades will be inclined upwardly and rearwardly relative to the plane containing the second cutting edges of the lower blades to permit pierce-cutting of a V-shaped notch.

2. The subject matter of claim 1 in which the said adjusting means includes elongated longitudinal openings in each of said blades and bolts extending transversely through said openings to secure the blades in cutting position, said blades being adjustable toward and away from said first vertical plane, into said first and second cutting positions.

3. A mechanism for cutting sheet material and of the type having a base, a frame supported on the base and having a projecting portion extending over the forward portion of the base to define a work receiving throat therewith, a ram vertically reciprocable in the extending portion of the frame, cutting means including vertically aligned upper and lower rearwardly diverging cutting blade assemblies carried by the ram and base respectively to cut a V-shaped notch in a workpiece placed therebetween, the said upper blades comprising left and right similar polyhedrons each having a front face and fore and aft end faces, a first cutting edge on the lower portion of the front face and second and third cutting edges on the lower portions of said fore and aft end faces respectively, said second and third cutting edges being angularly related to said first cutting edge and defining an upwardly and forwardly inclined plane therewith, said lower blade assembly including a left and a right blade each having a first cutting edge vertically aligned with the said first cutting edges of the upper left and the upper right blades respectively, a second cutting edge on one of said lower blades angularly related to the first cutting edge on said one blade, said second cutting edges on said one lower and the upper blades lying in a substantially common vertical plane, and adjusting means associated with the blades permitting adjustment of the blades into cutting relationship with the said first cutting edges of the upper blade assembly arranged and aligned to cooperate with the said first cutting edges of the lower blade assembly and the second cutting edge on said lower blade arranged to cooperate with the second cutting edge of an upper blade, whereby the said V-shaped notch cut in the workpiece is provided with a relieved portion adjacent to the vertex of said notch and said upper blades being adapted and arranged for selective reversibility on said ram permitting adjustment thereof into cutting relationship with their first cutting edges and arranged and aligned to cooperate with the said first cutting edges of the lower blades, and the third cutting edge on one of said upper blades arranged to cooperate with a portion of the first cutting edge of one of said lower blades whereby a V-shaped notch may be cut in the workpiece.

4. The subject matter of claim 3 wherein the said relieved portion is V-shaped, one side of which is common with and forms an extension of one side of said notch, the other side being angularly related thereto intersecting the other side of the notch.

5. The subject matter of claim 3 in which the said adjusting means include elongated longitudinal openings in each of the said blades and bolts extending transversely through said openings to secure the blades in cutting position, said blades being adjustable toward and away from the fore and aft centerlines of said ram and base.

6. The subject matter of claim 1 wherein the said first vertical plane contains the fore and aft centerlines of the frame and the base.

References Cited by the Examiner

UNITED STATES PATENTS

| | | | |
|---|---|---|---|
| 1,351,115 | 8/1920 | Morse | 83—693 X |
| 2,727,569 | 12/1955 | Patterson | 83—467 |
| 3,215,017 | 11/1965 | Rutz | 83—685 |

ANDREW R. JUHASZ, *Primary Examiner.*